United States Patent [19]

Hertzog

[11] 4,045,540

[45] Aug. 30, 1977

[54] PROCESS FOR THE SYNTHESIS OF AMMONIUM NITRITE

[75] Inventor: Richard Ross Hertzog, Morristown, N.J.

[73] Assignee: Allied Chemical Corporation, Morris Township, N.J.

[21] Appl. No.: 665,584

[22] Filed: Mar. 10, 1976

[51] Int. Cl.² .................................... C01B 21/50
[52] U.S. Cl. .................................... 423/385
[58] Field of Search .................... 423/385, 387

[56] References Cited

U.S. PATENT DOCUMENTS

| | | | |
|---|---|---|---|
| 1,061,630 | 5/1913 | Pauling | 423/385 |
| 1,070,070 | 8/1913 | Rothe | 423/385 |
| 2,797,144 | 6/1957 | Joris | 423/385 |
| 2,805,123 | 9/1957 | Bostian | 423/385 |

Primary Examiner—Earl C. Thomas
Attorney, Agent, or Firm—Fred L. Kelly

[57] ABSTRACT

Ammonium nitrite is commercially produced by contacting a gaseous stream containing nitric oxide, nitrogen dioxide and oxygen with an aqueous solution containing a basically reacting ammonium compound in an absorption system. However, at normal production rates, serious problems have been encountered because of the emission of unreacted nitric oxide which causes pollution of the atmosphere. It has now been found that by adding controlled supplemental quantities of nitrogen dioxide to the absorption system, nitrogen oxide emission is substantially reduced.

5 Claims, 1 Drawing Figure

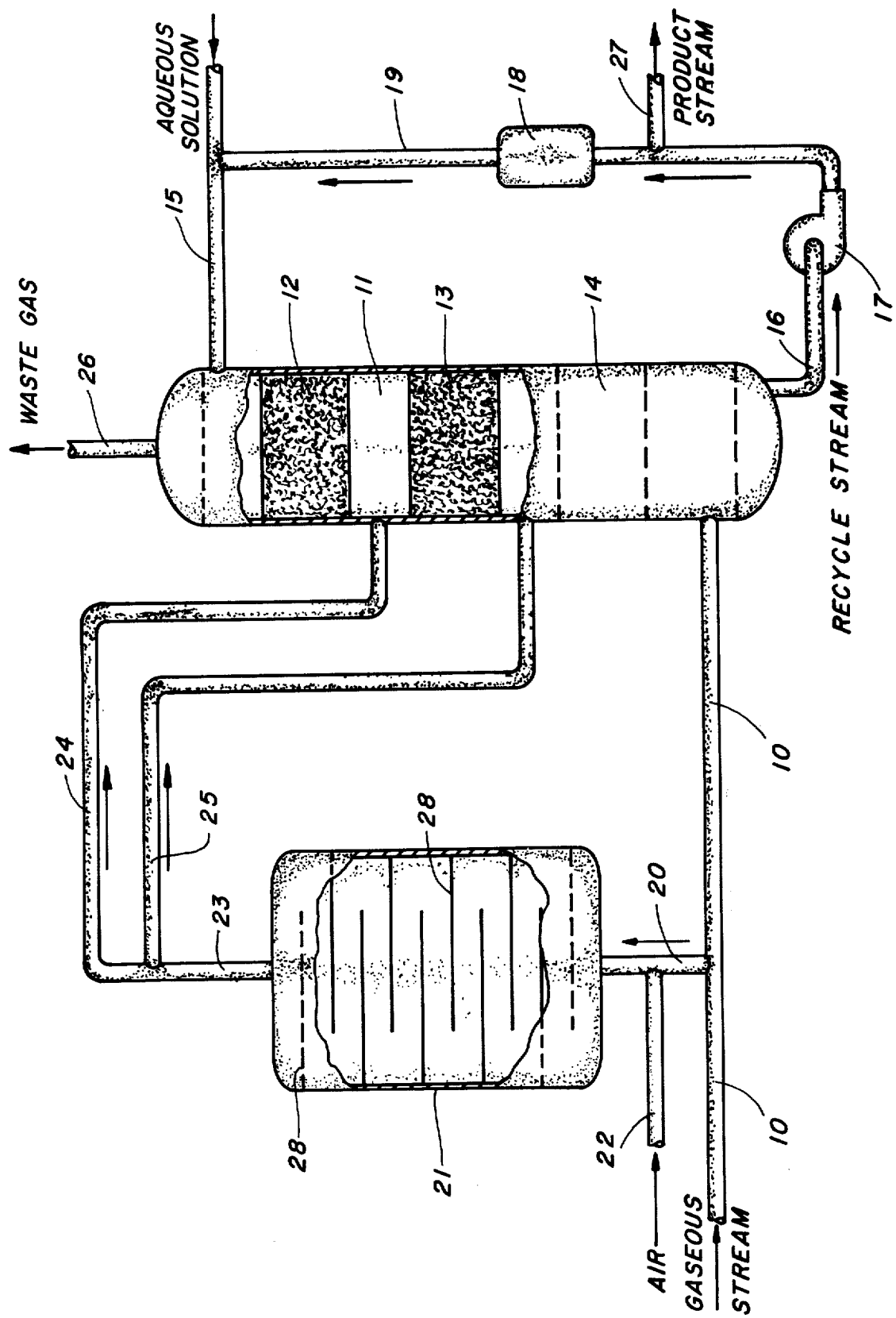

PROCESS FOR THE SYNTHESIS OF AMMONIUM NITRITE

BACKGROUND OF THE INVENTION

This invention relates to a process for producing ammonium nitrite. More particularly, it relates to an improved process for producing ammonium nitrite by contacting in an absorption system a gaseous stream containing nitric oxide, nitrogen dioxide and oxygen with an aqueous solution containing a basically reacting ammonium compound, said process charaterized by reduced nitrogen oxide emission accomplished by adding controlled supplemental quantities of nitrogen dioxide to the absorption system.

One of the principal uses of ammonium nitrite is for the production of hydroxylamine compounds. For such work an aqueous solution of ammonium nitrite can be used.

The nitrite-producing reaction dealt with herein can be considered as a type of gas absorption including physical absorption of gaseous components by the basic ammonium compound solution and stripping of volatile components from this solution, together with a multiplicity of liquid phase and gas phase reactions and side reactions. While the complexity and rapidity of what occurs during absorption may preclude exact knowledge of the chemical and physical mechanisms for the process, the following equations will serve as a guide for understanding the reaction using, for example, ammonium bicarbonate as the basic ammonium compound added to the absorbing solution.

Principal Reactions $$2NO + O_2 \rightleftarrows 2NO_2 \quad (1)$$

$$NO + NO_2 \rightleftarrows N_2O_3 \quad (2)$$

$$N_2O_3 + H_2O \rightarrow 2HNO_2 \quad (3)$$

$$HNO_2 + NH_4HCO_3 \rightarrow NH_4NO_2 + CO_2 + H_2O \quad (4)$$

(or other basic ammonium salt)

A summation of the preceding equations can be written as follows:

$$4NO + O_2 + 4NH_4HCO_3 \rightarrow 4NH_4NO_2 + 2H_2O + 4CO_2 \quad (5)$$

(or other basic ammonium salt)

Side reactions $$5NO_2 + 4NH_4HCO_3 \rightarrow \quad (6)$$

(or other basic ammonium salt)

$$3NH_4NO_3 + NH_4NO_2 + 2H_2O + NO + 4CO_2$$

$$4NH_3 + 4NO + O_2 \rightarrow 4N_2 + 6H_2O \quad (7)$$
$$4NH_3 + 2NO_2 + 2NO \rightarrow 4N_2 + 6H_2O \quad (8)$$

$$NH_4NO_2 \rightarrow N_2 + 2H_2O \quad (9)$$

Pertinent patents in this field include U.S. Pat. No. 2,797,144, issued June 25, 1957, to Joris, U.S. Pat. No. 2,805,123, issued Sept. 3,1957, to Bostian U.S. Pat. No. 2,805,122, issued Sept. 3,1957, to Bostian et al., and U.S. Pat. No. 3,932,593, issued Jan. 13, 1976, to Bonfield. Although each of these patents represents an important contribution to this art, none teaches a process that overcomes the basic problem of environmental pollution by nitrogen oxide emission. Accordingly, research has continued to develop an improved process for production of ammonium nitrite, wherein nitrogen oxide emission is substantially reduced.

SUMMARY OF THE INVENTION

The process of the present invention may be summarized as follows. In a process for producing ammonium nitrite by the absorption of a gas containing nitric oxide, nitrogen dioxide, oxygen and at least 65 percent by volume of inert gas in an absorption system with an aqueous absorbing solution containing a basically reacting ammonium compound, employing entering gas with at least 2.0 mol ratio of nitric oxide:nitrogen dioxide and employing absorbing solution having normality of at least 0.01 with respect to the basic ammonium reactants, the improvement which comprises adding supplemental nitrogen dioxide to said gas being absorbed in the absorption system in amount sufficient to maintain a nitric oxide:nitrogen dioxide mol ratio between 0.8 and 1.0 in the exiting gas, said supplemental nitrogen dioxide being added to said gas when the absorption of nitrogen oxides is 50 to 95 percent complete based on the nitrogen oxide in the entering gas.

The introduction of supplemental nitrogen dioxide into the absorption system in accordance with the present invention reduces vent losses of nitrogen oxides up to at least about 30 percent or more, as compared with prior art methods. Moreover, such improvement reflects a significant cost advantage due to the large tonnages of ammonium nitrite which are used annually by industry, for example, in the production of hydroxylamine compounds. Hydroxylamine compounds are used in large quantities for the manufacture of caprolactam via an intermediate, cyclohexanone oxime.

DESCRIPTION OF THE PREFERRED EMBODIMENT

The preferred embodiment of this invention may be briefly stated as follows. In a process for producing ammonium nitrite by the absorption of a gas containing nitric oxide, nitrogen dioxide, oxygen and at least 65 percent by volume of inert gas in an absorption system with an aqueous absorbing solution containing a basically reacting ammonium compound, employing entering gas with at least 2.0 mol ratio of nitric oxide:nitrogen dioxide and employing absorbing solution having normality of at least 0.01 with respect to the basic ammonium reactants, the improvement which comprises adding supplemental nitrogen dioxide to said gas being absorbed in the absorption system in amount sufficient to maintain a nitric oxide:nitrogen dioxide mol ratio between 0.9 and 1.0 in the exiting gas, said supplemental nitrogen dioxide being added to said gas when the absorption of nitrogen oxides to 60 to 90 percent complete based on the nitrogen oxides in said entering gas.

DESCRIPTION OF THE DRAWING

The accompanying drawing is a diagrammatic flow sheet illustrating the preferred embodiment of the present invention.

DETAILED DESCRIPTION OF THE INVENTION

When in accordance with the process of the present invention a gaseous stream containing nitric oxide, nitrogen dioxide and oxygen is contacted with an aqueous solution containing a basically reacting ammonium compound, the reaction to form ammonium nitrite is believed to occur by a series of step-wise reactions as described hereinabove.

Gaseous streams which may be used for the practice of this invention can be obtained by catalytic combustion of ammonia-air mixtures, by electric arc combustion of air, by thermal fixation of the nitrogen in the air, or as by-product gas from other chemical processes. Gaseous streams containing nitric oxide produced by catalytic combustion of ammonia-air mixtures are preferred because they are ordinarily the most economical for the most efficient practice of this invention. In particular, gaseous streams derived from combustion of ammonia-air mixtures having from about 6 to 10 volume percent ammonia are especially preferred for their economy and efficiency in the process of the present invention. Such gases contain at the oxidizer exit approximately 6 to 10 volume percent nitric oxide on an anhydrous and ammonia free basis, together with approximately 8 to 12 volume percent oxygen and 65 to 80 volume percent nitrogen.

When a gaseous stream containing nitric oxide is employed which does not also contain oxygen, oxygen from an oxygen containing gas, conveniently air, may be introduced into the gaseous stream.

It has been found that higher yields of ammonium nitrite and significant reduction in vent losses of nitrogen oxides are obtained by the introduction of controlled supplemental quantities of nitrogen dioxide into the absorption system. While various means may be used to introduce nitrogen dioxide into the absorption system of the process of the present invention, the process in its preferred form involves continuously injecting the nitrogen dioxide directly into the absorption system. The nitrogen dioxide is generally introduced into the absorption system in an amount corresponding to a concentration of at least 1.0 volume percent of the gaseous stream in the absorption system. Preferably, sufficient nitrogen dioxide is added to maintain a nitric oxide: nitrogen dioxide mol ratio between 0.9 and 1.0 in the exiting gas from the absorption system. Preferably, the nitrogen dioxide is added when the absorption of nitrogen oxides is 60 to 90 percent complete.

The term "basically reacting ammonium compound" as used herein is intended to include one or more members of the group consisting of ammonium carbonate, ammonium bicarbonate and ammonium hydroxide. The basically reacting ammonium compound employed in the process of the present invention may be conveniently incorporated in the aqueous solution prior to the introduction of this solution into the absorption system for ammonium nitrite production. Desirably, the absorbing solution should always have a normality of at least 0.01 with respect to the basic ammonium reactants.

While the selected basically reacting ammonium compound may be employed in the aqueous solution in various concentrations, when ammonium bicarbonate is used as the basically reacting ammonium compound, the concentration of the compound in the aqueous solution is generally from about 1 to 21 weight percent, and is preferably from about 4 to 20 weight percent. When ammonium carbonate is employed as the basically reacting ammonium compound, the concentration of the compound in the aqueous solution is generally from about 1 to 30 weight percent, and preferably from about 4 to 20 weight percent. More than about 21 weight percent ammonium bicarbonate or more than about 30 weight percent ammonium carbonate is not possible under normal operating conditions due to the limit of solubility of these compounds in water. Highest yields of ammonium nitrite are obtained when the aqueous solution which contains the basically reacting ammonium compound is maintained at a temperature between about $-5°$ and $35°$ C.

The aqueous absorption solution in the process of the present invention should be maintained at a pH of at least about 7.0, preferably 7.5 to 8.5, thereby avoiding significant decomposition of the ammonium nitrite product which occurs under acidic conditions.

The supplemental nitrogen dioxide for addition to the absorption system in accordance with the present invention may be prepared by any suitable method known to this art. For example, it is conveniently prepared by the well known ammonia oxidation-nitric oxide oxidation method. Ammonia is catalytically oxidized to form nitric oxide and water. Under conditions normally used, about 94–96 percent of the ammonia is converted to nitric oxide as the reaction proceeds at a very rapid rate. Nitrogen dioxide is formed from the oxidation of nitric oxide. The oxidation proceeds spontaneously at atmospheric temperatures but contrary to the general rule in such cases at a relatively slow rate. The reaction also differs from general rules in that it proceeds more rapidly with lowered temperatures whereas most reaction rates increase as the temperature is increased. For these reasons, the oxidation of nitric oxide is usually carried out as as low a temperature as economically practical and a relatively long retention time is provided. The reaction is exothermic, and therefore, cooling must be provided to remove the heat of reaction as well as to cool the gas to the temperature desired for the nitric oxidation. Normally, the temperature for final reaction is about $15°$–$75°$ C., with reaction times up to 15 minutes or longer.

The preferred process of this invention may be illustrated by reference to the accompanying drawing wherein the process is carried out in a continuous manner.

A major portion of a gaseous stream such as produced by ammonia oxidation containing a nitric oxide, nitrogen dioxide, and oxygen and having at least 2.0 mol ratio of nitric oxide:nitrogen dioxide is passed via line 10 into the lower portion of absorption chamber 11, having three packed sections 12, 13 and 14. The gaseous stream passes upwardly through absorption chamber 11 in countercurrent contact with an aqueous solution containing a basically reacting ammonium compound, e.g., a mixture of ammonium carbonate and ammonium bicarbonate. The aqueous solution is introduced to the upper portion of chamber 11 via line 15 and flows downwardly over the packing 12, 13 and 14. A portion of the aqueous solution enriched in ammonium nitrite is withdrawn as recycle stream from chamber 11 via line 16 and is passed by pump 17 through cooling apparatus 18 wherein the recycle stream is cooled to the desired temperature, e.g., $11°$ C. The recycle stream passing from cooling apparatus 18 is recycled via line 19 and line 15 to chamber 11. A minor portion of the gaseous stream in line 10 is passed via line 20 to nitric oxide oxidizer 21 which is sized to give an average reaction time of from 2 to 15 minutes. Air is introduced via line 22 and line 20 to oxidizer 21. The gaseous stream from line 20 passes upwardly through oxidizer 21 at the desired reaction temperature, e.g., $45°$ to $55°$ C., whereby a substantial portion, e.g., 80 to 90 percent of the nitric oxide is oxidized to nitrogen dioxide. Nitric oxide oxidizer 21 preferably contains baffles 28 to prevent end to end mixing of the gas in the oxidizer. The oxidized gas exits nitric oxide oxidizer 21 via line 23 and passes via lines 24 and 25 to absorption chamber 11 where the gas is fed below packed sections 12 and 13. Waste gas from chamber 11 is discharged via line 26. A product stream comprising aqueous solution enriched in ammonium nitrite and containing residual basically reacting ammonium compounds is withdrawn from the process via line 27.

The present invention may be further illustrated by reference to the following example. All parts and percentages are by weight unless otherwise indicated.

EXAMPLE 1 (Comparative)

Part 1 (Conventional Process)

An absorption tower having three packed sections, packed with 1 and 2 inch porcelain saddles, as shown in the accompanying drawing, was continuously fed at about 11° C. and at atmospheric pressure with an aqueous solution containing 5.5 percent ammonium bicarbonate and 16.4 percent ammonium carbonate at a flow rate of 516 parts per hour. The solution in the tower was continuously and countercurrently contacted with 518 parts per hour of a gaseous stream having the following volume percent composition: 17.37% water vapor, 67.5% nitrogen, 8.25% nitric oxide, 0.92% nitrogen dioxide, and 5.96% oxygen. A portion of the aqueous solution enriched in ammonium nitrite was cooled and continuously recycled to the aqueous solution feed. A product stream was continuously withdrawn from the recycle stream at a flow rate of 598 parts per hour, said stream containing 13.2-13.6 percent ammonium nitrite. Exit gas from the absorption tower contained 1.18 to 1.29 volume percent nitrogen oxides.

Part 2 (Process of Present Invention)

In a second run, the above absorption tower was continuously fed with an aqueous solution of the above composition at a flow rate of 516 parts per hour. The solution in the chamber was continuously and countercurrently contacted with 466 parts per hour of a gaseous stream of the above composition. As shown in the drawing, about 52 parts per hour of a gaseous stream of the above composition and 12 parts per hour of air were continuously fed to the nitric oxide oxidizer. The gas temperature in the nitric oxide oxidizer was 40°-70° C., and about 90 percent of the nitric oxide was converted to nitrogen dioxide. The gaseous stream from the nitric oxide oxidizer at about 70° C. was divided as shown in the drawing, about 16.7 percent of the stream being continuously fed to the absorption tower immediately below the top packed section and about 83.3 percent of the stream being continuously fed to the absorption tower immediately below the middle packed section, at which point in the tower the absorption of nitrogen oxides was about 60 percent complete based on the nitrogen oxides being fed to the base of the tower. By said addition of nitrogen dioxide to the absorption tower, the nitric oxide:nitrogen dioxide mol ratio of the exiting gas was maintained at about 0.95. In the absorption tower, a portion of the aqueous solution enriched in ammonium nitrite was cooled to 11° C. and continuously recycled to the aqueous solution feed. A product stream was continuously withdrawn from the recycle stream at a flow rate of about 600 parts per hour, containing about 14 percent ammonium nitrite. Exit gas from the absorption tower contained 0.86–0.87 volume percent nitrogen oxides. This represents a 30 percent reduction in air pollution over the conventional process.

From the viewpoint of process economics, although nitrogen oxide emission reduction from about 1.25 volume percent to about 0.87 volume percent appears small, it represents a reduction in ammonia loss of 3–3.5 percent based on ammonia oxidizer feed. As mentioned above, gaseous streams derived from catalytic combustion of ammonia-air mixtures having from about 6 to 10 percent ammonia are especially preferred for their economy and efficiency in the process of the present invention.

EXAMPLE 2

The procedure of Example 1 (Part 2) was followed except that the gas flow to the nitric oxide oxidizer was reduced to about one-seventh of the gas feed used in Example 1, and all of the gas from the nitric oxide oxidizer was fed continuously to the absorption tower immediately below the top packed section. The nitric oxide:nitrogen dioxide mol ratio of the exiting gas from the absorption tower was maintained at about 0.9, and the exit gas from the absorption tower contained only 0.88 volume percent nitrogen oxides.

EXAMPLE 3 (Comparative)

The procedure of Example 1 (Part 2) was followed except that all of the gas flow from the nitric oxide oxidizer was fed to the base of the absorption tower through a line not shown in the drawing. As compared with Part 1 of Example 1, no improvement was noted in ammonium nitrite yield or percent nitrogen oxides in the exit gas from the absorption tower. Specifically, the product stream contained only 12.13 percent ammonium nitrite and the exit gas from the absorption tower contained 1.23 volume percent nitrogen oxides. This test shows that it is critical to add the supplemental nitrogen dioxide to the absorption system after the absorption of nitrogen oxides is 50 to 95%, preferably 60 to 90%, complete. Moreover, Example 2 shows that surprisingly good results were obtained when a relatively small amount of nitrogen dioxide was added high in the absorption tower below the top packed section.

I claim:

1. In a process for producing ammonium nitrite by the absorption of a gas containing nitric oxide, nitrogen dioxide, oxygen and at least 65 percent by volume of inert gas in an absorption system with an aqueous absorbing solution containing a basically reacting ammonium compound selected from the group consisting of ammonium carbonate, ammonium bicarbonate, ammonium hydroxide and mixtures thereof, employing entering gas with at least 2.0 mol ratio of nitric oxide:nitrogen dioxide and employing absorbing solution having normality of at least 0.01 with respect to the basically reacting ammonium compound, the improvement which comprises adding supplemental nitrogen dioxide to said gas being absorbed in the absorption system in amount sufficient to maintain a nitric oxide:nitrogen dioxide mol ratio between 0.8 and 1.0 in the exiting gas, said supplemental nitrogen dioxide being added to said gas when the absorption of nitrogen oxides is 50 to 95 percent complete based on the nitrogen oxides in the entering gas.

2. The process of claim 1 wherein said basically reacting ammonium compound is ammonium bicarbonate.

3. The process of claim 1 wherein said basically reacting ammonium compound is a mixture of ammonium bicarbonate and ammonium carbonate.

4. The process of claim 1 wherein sufficient supplemental nitrogen dioxide is added to said absorption system to maintain a nitric oxide:nitrogen dioxide mol ratio between 0.9 and 1.0 in the gas exiting said absorption system.

5. The process of claim 4 wherein said supplemental nitrogen dioxide is added when the absorption of nitrogen oxides is 60 to 90 percent complete based on the nitrogen oxides in said entering gas.

* * * * *